Dec. 31, 1957     I. F. SCHRECK     2,818,189
DIE HANDLING UNIT FOR LIFT TRUCKS
Filed Dec. 7, 1954     4 Sheets-Sheet 1
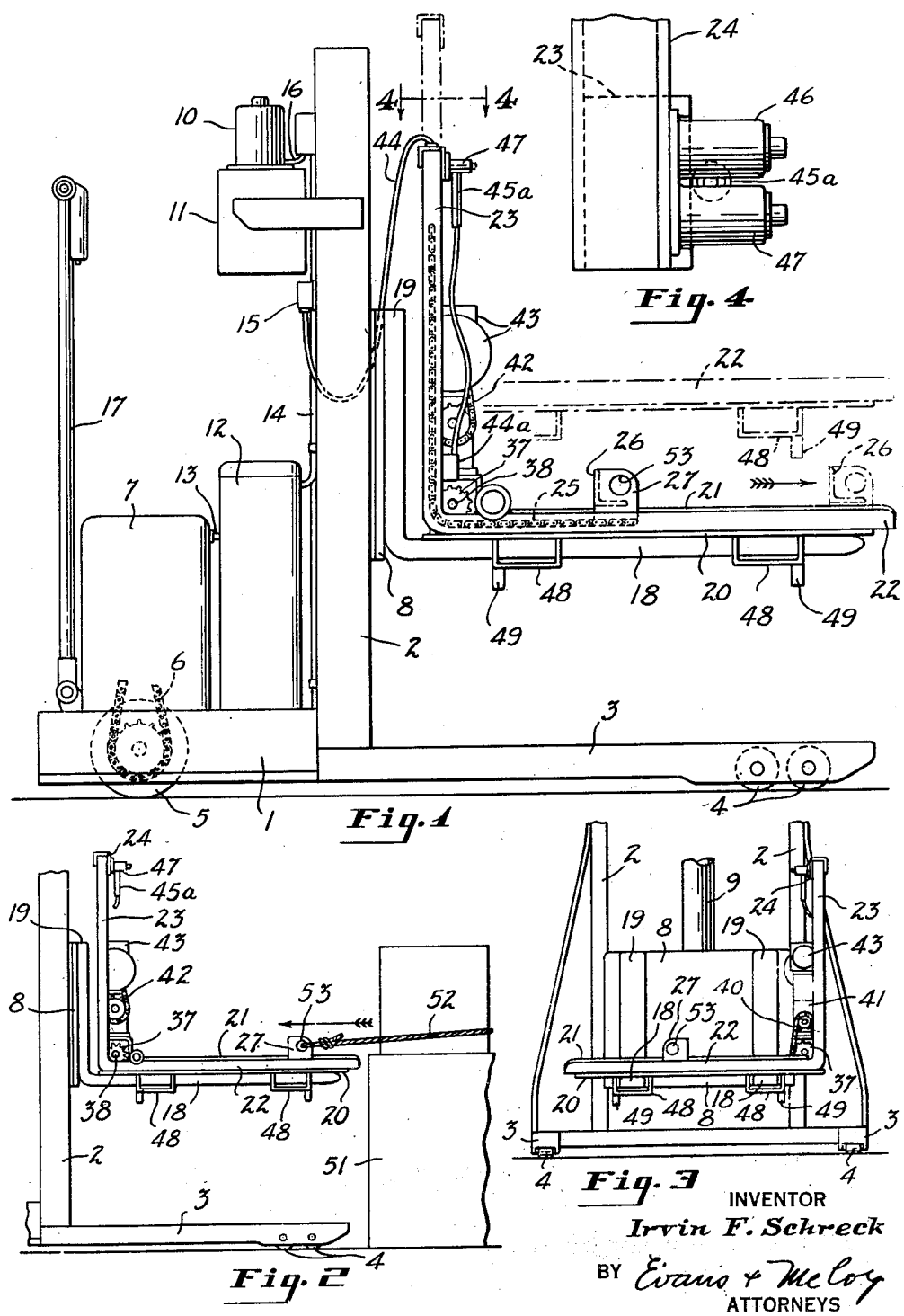
INVENTOR
Irvin F. Schreck
BY Evans & McCoy
ATTORNEYS Dec. 31, 1957  I. F. SCHRECK  2,818,189
DIE HANDLING UNIT FOR LIFT TRUCKS
Filed Dec. 7, 1954  4 Sheets-Sheet 2
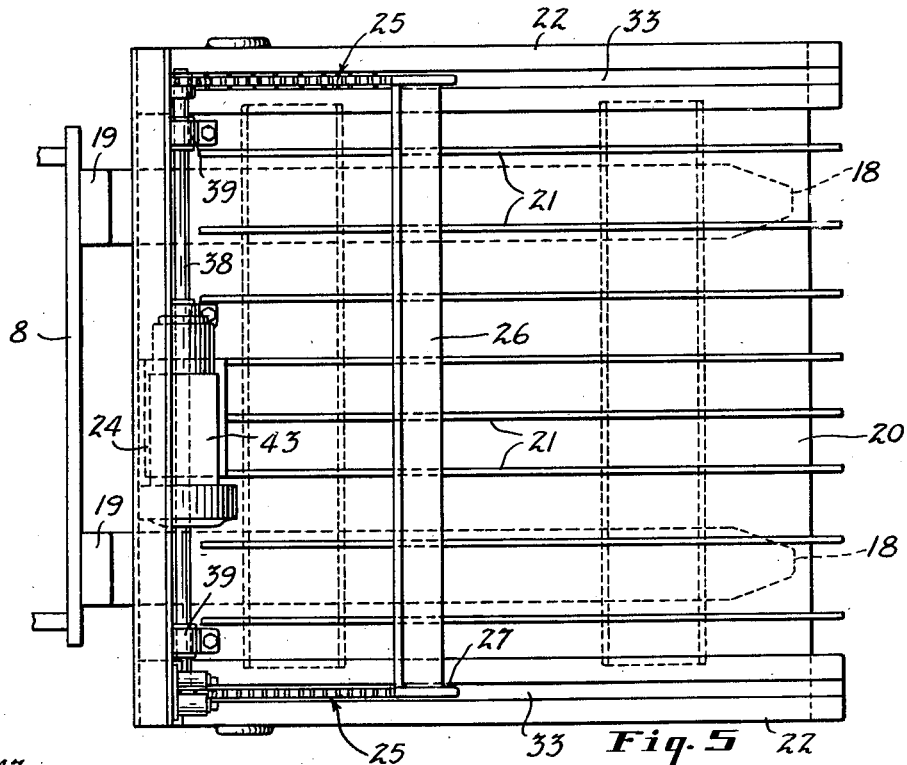
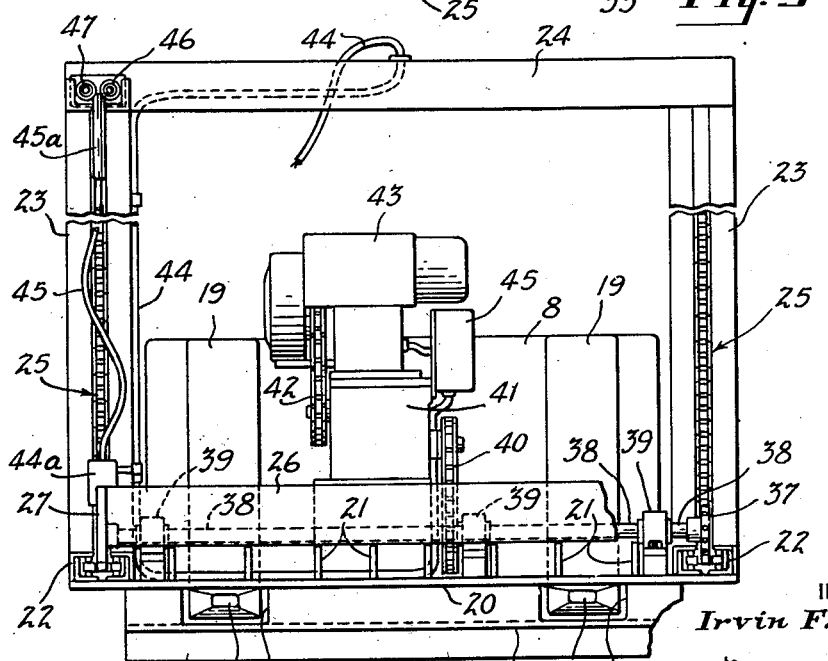
INVENTOR
Irvin F. Schreck
BY Evans + McCoy
ATTORNEYS Dec. 31, 1957     I. F. SCHRECK     2,818,189
DIE HANDLING UNIT FOR LIFT TRUCKS
Filed Dec. 7, 1954     4 Sheets-Sheet 3
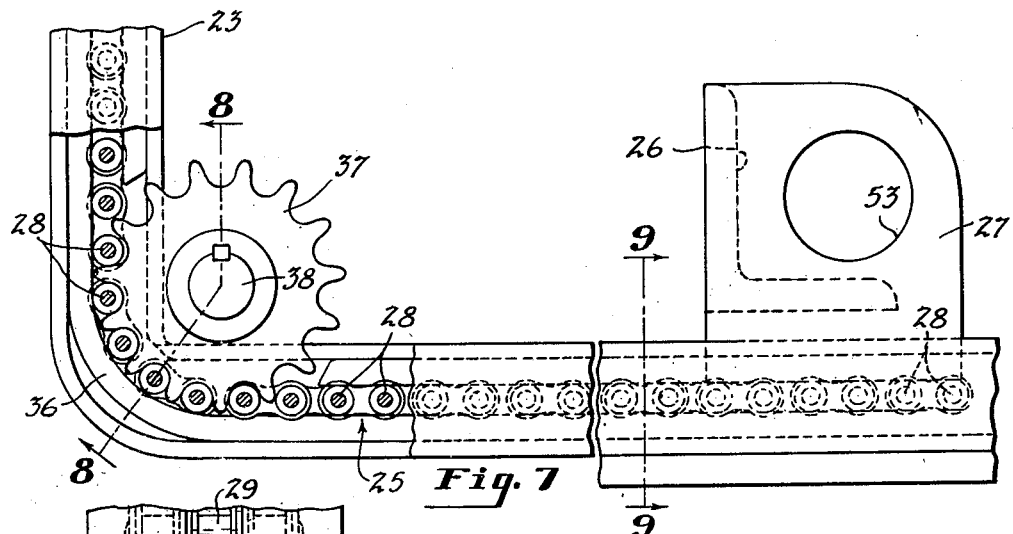
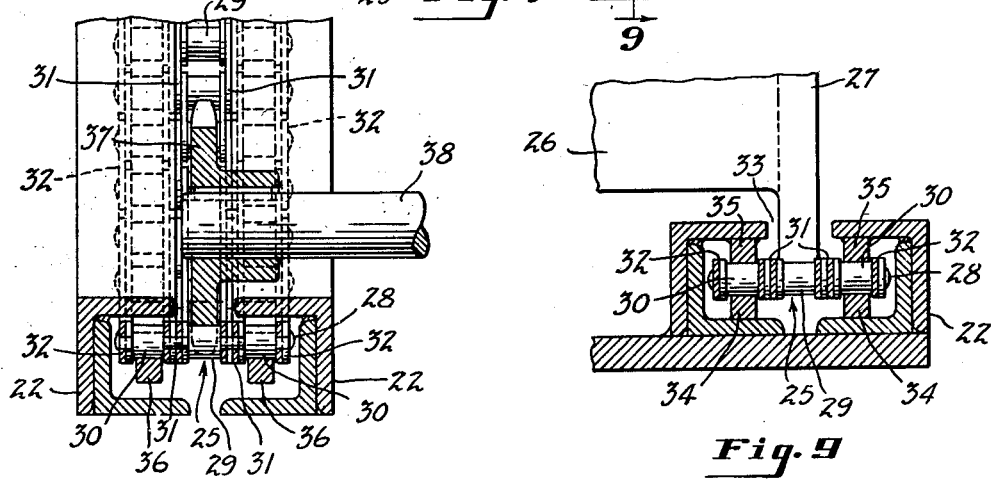
INVENTOR
*Irvin F. Schreck*
BY *Evans + McCoy*
ATTORNEYS

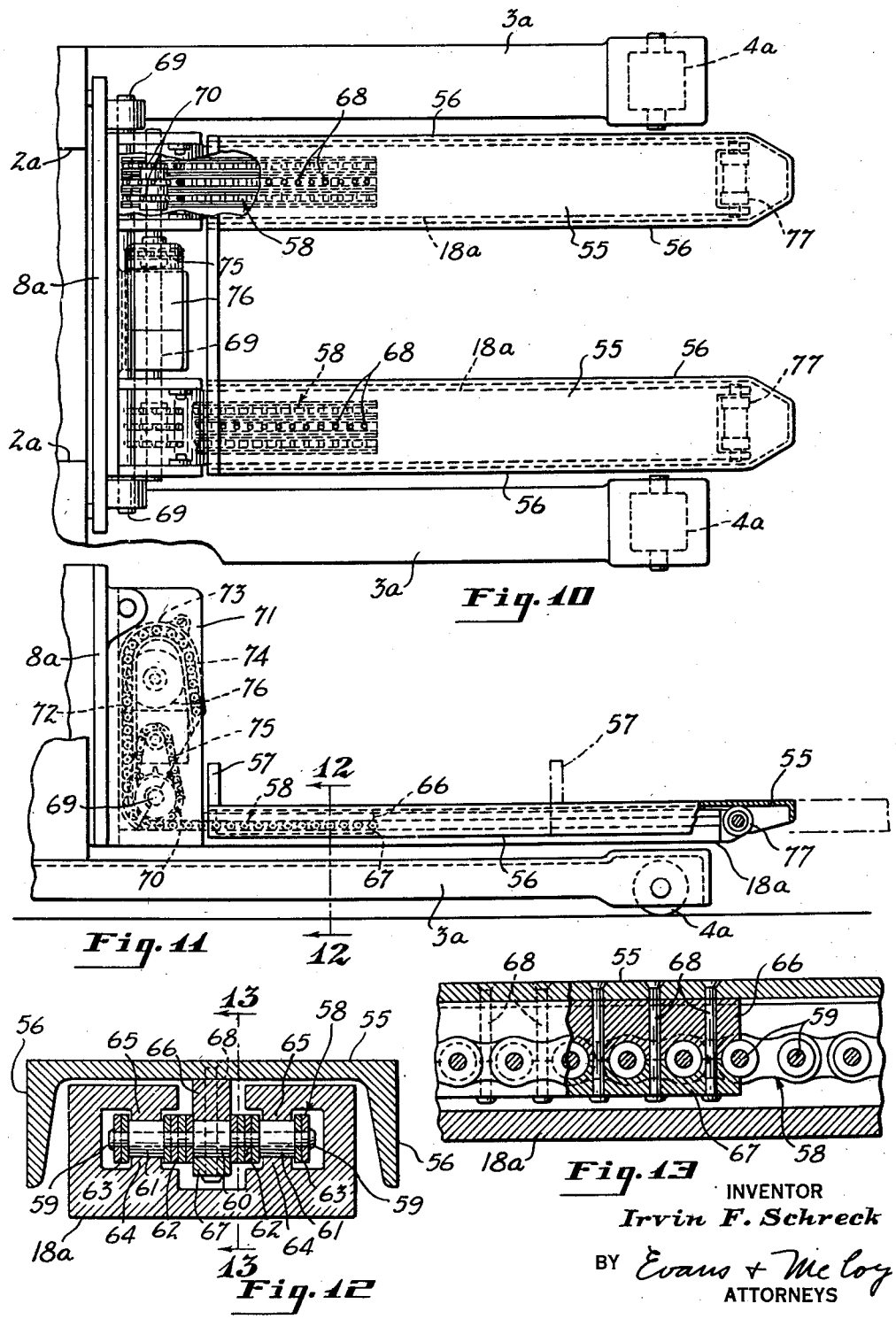

United States Patent Office 2,818,189
Patented Dec. 31, 1957

2,818,189

DIE HANDLING UNIT FOR LIFT TRUCKS

Irvin F. Schreck, South Euclid, Ohio

Application December 7, 1954, Serial No. 473,667

16 Claims. (Cl. 214—514)

This invention relates to load handling units and particularly to load handling units for use on lift trucks to facilitate the loading and unloading thereof.

The device of the present invention is a load supporting and shifting unit that is adapted to be mounted on the elevator carriage of a lift truck and that carries a power driven load shifter mechanism by means of which a load can be shifted on the carriage incident to the loading and unloading operations. The load shifting means may be in the form of a pusher movable back and forth on a horizontally extending load supporting member, or may be in the form of a load carrier mounted to reciprocate on a load supporting member.

The load handling unit may be in the form of a load carrying platform that can be supported on a floor independently of the truck that carries a power driven load shifting mechanism that is adapted to be picked up by the lift fork of a truck and that can be placed in various position on the load carrying fork of the truck for shifting a load forwardly or sidewise to deliver the same forwardly or to one side or the other of the truck, the load shifting mechanism being employed to discharge a load from the platform or to pull a load onto the platform.

The load shifting unit may include a load shifting member in the form of a load carrier which has arms that telescope with the fork arms of a lift carriage to engage with a load and shift it to or from load carrying position.

In order to provide a simple and compact load carrying unit, the actuating mechanism for the load shifter includes a sprocket chain which is attached at one end to the load shifter and which is unattached at its opposite end. The chain is actuated by a reversible power driven sprocket to push or pull the shifter, guides being provided for the end portion of the chain to which the shifter is attached which hold this portion of the chain against buckling so that a pushing thrust as well as a pulling thrust may be transmitted through the chain. For small units a single pusher chain may be employed. In larger units a plurality of simultaneously actuated chains may be used.

The invention has for an object to provide a simple, compact and convenient device for loading or unloading a lift truck carriage.

A further object is to provide a load shifter unit that can be positioned to shift a load forwardly or rearwardly or laterally with respect to the truck travel, to unload or load in the direction of travel or to and from either side of the line of travel.

A further object of the invention is to provide a motor driven pushing and pulling mechanism which includes a flexible thrust transmitting member that is so guided that it occupies a minimum of space.

Reference should be had to the accompanying drawings forming a part of this specification, in which:

Figure 1 is a side elevation of a lift truck with a load handling unit embodying the invention mounted on the lift carriage;

Fig. 2 is a fragmentary side elevation of the lift truck showing a load being transferred to the load carriage unit on the lift carriage;

Fig. 3 is a front elevation of a lift truck showing the load handling unit mounted with its movable load shifter disposed to travel laterally of the truck to discharge a load to or to pull a load from the left hand side of the truck;

Fig. 4 is a fragmentary top plan view of the control switches for the electric driving motor on the load handling unit;

Fig. 5 is a top plan view of the load carrying unit on an enlarged scale;

Fig. 6 is a front elevation of the load carrying unit on an enlarged scale;

Fig. 7 is a fragmentary side elevation on an enlarged scale showing one of the load shifter operating chains and its driving sprocket;

Fig. 8 is a section taken on the broken line indicated at 8—8 in Fig. 7;

Fig. 9 is a fragmentary transverse section taken on the line indicated at 9—9 in Fig. 7;

Fig. 10 is a fragmentary top plan view of the forward end of a lift truck with a modified form of load handling unit thereon;

Fig. 11 is a side elevation of the forward end of the lift truck and load carrying unit shown in Fig. 10;

Fig. 12 is a vertical transverse section on an enlarged scale, taken on the line indicated at 12—12 in Fig. 11; and Fig. 13 is a fragmentary longitudinal section taken centrally through one of the lift fork arms.

In the accompanying drawings the load handling unit of the present invention is shown applied to a lift truck of the well known motor propelled draft tongue control type, which has a frame 1 on which a standard 2 is mounted, the frame 1 having parallel side members that extend forwardly from the standard 2 and that are supported at their forward ends on wheels 4, the frame 1 rearwardly of the standard 2 being supported on a single steering traction wheel 5. The wheel 5 is driven by a sprocket chain 6 from a suitable motor in a housing 7 that swivels with the wheel 5. A carriage 8 is mounted for vertical movement on the standard 2, being operated in a conventional manner by means of a vertically disposed hydraulic cylinder 9 which is supplied with fluid under pressure by a suitable motor driven pump mounted in a housing 10 and circulating liquid from a reservoir 11 to and from the cylinder 9.

The truck motors are powered by a battery 12 mounted in the frame 1, the battery having connections through a suitable conductor conduit 13 to the motor in the housing 7 and through similar connections 14 to a terminal 15 on the standard 2. Conductors in a conduit 16 connecting the terminal 15 to the motor housing 10 and the truck propelling motor and elevator motor are controlled by suitable switches on a draft tongue 17 that is connected with the swiveled wheel 5 to steer the truck, the tongue 17 having control switches for driving the propelling motor in forward or reverse direction and for operating the pump motor to raise or lower the carriage 8. The carriage 8, as shown in Figs. 1 to 6, carries a lifting fork having two horizontally extending arms 18 and upturned inner end portions 19 that are rigidly attached to the carriage 8.

The device of the prsent invention is designed for use with any lift truck having a load lifting fork on a vertically moving carriage. The load handling unit of the present invention as shown in Figs. 1 to 6, has a platform plate 20 upon the top of which a series of parallel load supporting bars 21 are mounted to provide a platform on which an article to be transported may be carried. At the sides thereof the plate 20 carries parallel side bars 22 which are connected at their inner ends to upright bars 23, the bars 23 being connected at their upper ends by a cross bar 24. Since the load carrying platform is of substantial width, two sprocket chains 25 are provided for actuating a load shifter pusher bar 26 that extends across the platform. The side bars 22 and upright bars 23 are hollow and provide guides for the two sprocket chains 25 which have end portions that slide in these bars. The ends of the chains 25 in the hollow horizontally disposed bars 22 are attached to the load shifter bar 26 which extends transversely across the load supporting bars 21. As best shown in Figs. 7 and 9, the pusher bar 26 is connected at its ends to the chains 25 by means of end posts 27 that are rigidly attached to the chains 25 and which support the pusher bar 26 above and clear of the load supporting bars 21.

As best shown in Figs. 8 and 9, each sprocket chain has regularly spaced pivot pins 28 each of which carries a central roller 29 and two side rollers 30. Intermediate links 31 connect the pivot pins 28 on opposite sides of the central rollers and side links connect the outer ends of the pins, the side rollers 20 being disposed between the links 31 and 32. The hollow side bars 22 of the supporting platform have slots 33 extending centrally along the tops thereof to receive the pusher supporting posts 27 that are rigidly attached to the center rollers 29 of each of the chains. A pair of bottom guide rails 34 are provided in each of the side bars 22 for supporting the chain 25. The guide rails 34 extend horizontally beneath the side rollers 30 and support the horizontal run of the chain, and a pair of holddown rails 35 closely overlie the tops of the rollers 30 to hold the horizontally extending portion of the chain against buckling movements.

As shown in Fig. 7, the supporting rails 34 extend into the hollow vertical bars 23 and have curved portions 36 at the juncture of the bars 22 and 23 for guiding the chains 25 from the horizontal guide bars 22 into the vertical guide bars 23. A sprocket 37 meshes with each of the chains 25 at the juncture of the horizontal and vertical guide bars in which it slides and both sprockets 37 are fixed to a transverse horizontal shaft 38 that is journaled as shown in Figs. 5 and 6, in bearing brackets 39 carried by the platform plate 20. The shaft 38 is driven by a sprocket chain 40 that is in turn driven through suitable reduction gearing in a housing 41 that is driven through a sprocket chain 42 by a suitable electric motor in the motor housing 43. The driving mechanism may be reversible to move the chain outwardly toward the pusher 26 to push the same away from the sprockets 37 or to pull the same toward the sprockets 37.

Current is supplied to the electric motor in the housing 43 through suitable conductors in a flexible conduit 44 that is adapted to be plugged into the terminal 15 on the standard and that extends to a control box 44a. An extension cord 45 extending from the control box 44a carries forward and reverse push button switches 46 and 47 that control the load shifting motor. The control switches 46 and 47 are carried by a handle member 45a that is detachably supported on the cross bar 23. By grasping the handle 45a and detaching it from the frame, the operator can control the operation of the load shifting motor from a convenient position alongside the load being shifted.

The load lifting unit is adapted to be supported on a floor surface independently of the truck in position to be picked up by the fork arms of the truck. Two upwardly facing channel bars 48 extend transversely across the underside of the platform plate 20 and are welded thereto. The channels 48 are spaced apart a distance corresponding to the spacing of the forks 18 and are of a size to receive the forks 18. The channels 48 are open at both ends to permit the forks to be inserted into the channels from either side of the load handling unit. The load handling unit can be supported as shown in Fig. 3 of the drawings to transfer a load to the left of the truck, or by inserting the forks 18 into the channels 48 from the opposite side of a load handling unit. The position of the load handling unit may be reversed with respect to the lift truck, so as to transfer the load to the right of the truck. Each of the channel bars 48 has a downwardly projecting supporting flange 49, the flanges 49 serving to support the unit at a proper height to receive the fork arms 18. The channels 48 have alined transverse openings 50 which are spaced apart to receive the forks 18 as shown in Fig. 1 of the drawings, so that the unit is supported in a position such that the pusher 26 moves longitudinally of the arms 18.

As shown in Fig. 2 of the drawings, a load may be transferred from a suitable platform table of bed 51 to the load supporting platform by means of a cable 52 attached to openings 53 in the pusher bar 27. Movement of the pusher bar toward the sprockets 37 will pull an article engaged by the cable 52 onto the platform.

After the load handling unit has been picked up by the fork, the conductor cable 44 is plugged into the terminal socket 15 on the standard 2, after which the operation of the load shifting mechanism of the unit may be controlled by the push buttons 46 and 47. The load lifting unit would ordinarily be mounted on the truck as shown in Fig. 1 so as to move a load onto or off of the truck at the forward end thereof. However, when the truck is operated to deliver articles to one side or the other of a narrow aisle, the load handling unit can be mounted as shown in Fig. 3, or in a position reverse to that shown in Fig. 3 to deliver articles to or receive articles from the right or to the left of the truck.

In Figs. 10 to 13 of the drawings, a modified form of load handling unit is shown. This unit is employed on a lift truck similar to that shown in Fig. 1, having a standard 2a and a frame provided with frame side members 3a that extend forwardly from the standard and that are supported at their forward ends on wheels 4a. The truck has a carriage 8a that is mounted for vertical movement on the standard 2a and that is provided with forwardly projecting fork arms 18a.

The load handling unit has a load supporting portion provided with two forwardly extending arms 55 in the form of downwardly facing channels that overlie the fork arms 18a of the carriage and that have downwardly extending flanges 56 that straddle the fork arms 18a, the inner ends of the arms 55 being connected by a cross bar 57. The fork arms 55 which telescope on the form arms 18a of the truck are extended and retracted by means of multiple roller sprocket chains 58 that are attached at one end to the arms 55. The chains 58 have spaced pivot pins 59 each of which has a center roller 60 thereon and side rollers 61 between the center roller 60 and the ends of the pivot pin. The pivot pins 59 are connected by center links 62 that are disposed between the rollers 60 and 61 and side links 63 that are adjacent the ends of the links at the outer ends of the side walls 60. The chain 58 is thus provided with three longitudinal rows of rollers, one row being formed by the center rollers 60 and the other two rows being formed by the rollers 61.

The truck fork arms 18a are hollow and provide a guide for the end portions of the chains 58 which are attached to the fork arms 55. Each chain 58 is supported in its fork arm by means of supporting rails 64 upon which the side rollers 61 rest. Holddown rails 65 closely overlie the rollers 61 so that the upper and lower rails 64 and 65 hold the chains 58 against buckling when subjected to a pushing thrust.

As shown in Figs. 12 and 13, the extensible forks 55 are supported by blocks 66 that are interposed between the under side of the fork arms and the chains 58 and are securely clamped to the chains by means of blocks 67 engaging the undersides of the chains and rivets 68 which rigidly connect the fork arms 55 to the blocks 66 and 67 and the chains 58. The sprocket chains 58 are actuated by a horizontal shaft 69 adjacent the inner end of the unit which has multiple sprockets 70 that mesh with the chains 58, the sprockets 70 having teeth which engage with each of the three rows of rollers carried by the chains. The ends of the chains 58 opposite those attached to the fork arms 55 are guided for endwise movement in upwardly extending guides 72 inwardly of the sprockets 70. The guides 72 have forwardly extending curved portions 73 and downwardly extending end portions 74. By providing curved downwardly bent guideways for the unattached ends of the actuating chains, the height of the chain guideway in the inner end of the unit is reduced. The shaft 69 is driven through a sprocket chain 75 by an electric motor in a housing 76 mounted on the unit between the chain guideway 72. The fork arms 55 are supported clear of the fixed forks 18a by means of the supporting blocks 66 and rollers 77 which are mounted on the forward ends of the fixed fork arms 18a.

The load shifting member is controlled in the same manner as in the modification first described, being operated to advance the fork arms 55 to pick up a load and to retract the forks to shift the load to load carrying position on the truck.

It is to be understood that in accordance with the provisions of the patent statutes, variations and modifications of the specific devices herein shown and described may be made without departing from the spirit of the invention.

What I claim is:

1. A load handling unit having a load supporting member, a load shifting member movable on said supporting member, a sprocket chain having one end attached to said load shifting member and its opposite end unattached, a sprocket mounted on said unit and having driving engagement with said chain intermediate its ends, means for driving said sprocket in a direction to apply a pushing thrust to said load shifting member, and guides for said chain between said sprocket and said load shifting member and between said sprocket and the unattached end of the chain, said guides being disposed at an angle to one another and having end portions closely overlying the sprocket periphery to hold the chain in engagement with the sprocket, the guide between said sprocket and said load shifting member having portions closely overlying the faces of said chain that lie parallel to the sprocket axis to hold the same against buckling when subjected to pushing thrusts.

2. A load handling unit having a horizontally extending load supporting portion, a load shifting member mounted for movement back and forth on said supporting portion, a sprocket chain having one end attached to said load shifting member and its opposite end unattached, said chain having links connected end to end by parallel pivots, a sprocket rotatably mounted on said unit and in driving engagement with said chain intermediate its ends, reversible means for driving said sprocket to push or pull said load shifting member, and guides for said chain on opposite sides of said sprocket that have portions closely overlying the periphery of the sprocket to hold the chain in engagement therewith, the guide for the portion of the chain between said sprocket and said load shifting member having portions closely overlying the chain faces that are on opposite sides of the chain pivots to hold the chain against buckling when subjected to pushing thrusts.

3. A load handling unit having an upright portion and a load supporting portion extending horizontally from said upright portion, a load shifting member mounted on said load supporting portion for movement toward and away from said upright portion, a sprocket chain having one end attached to said load shifting member and its other end unattached, said chain extending inwardly from said load shifting member to said upright portion and having its pivots horizontally disposed, a sprocket mounted on said unit adjacent said upright portion to turn about a horizontal axis and having driving engagement with said chain, a reversible means for driving said sprocket to push or pull said load shifting member, a guide for the portion of the chain between said sprocket and said load shifting member having guide rails closely overlying the top and bottom faces of said chain to hold the chain against buckling when subjected to pushing thrusts, and a guide carried by said upright portion and extending upwardly from said sprocket which supports the free end portion of said chain.

4. A load handling unit having an upright portion and a load supporting portion extending horizontally from said upright portion, a load shifting member mounted on said load supporting portion for movement toward and away from said upright portion, a sprocket chain having one end attached to said load shifting member and its other end unattached, said chain extending inwardly from said load shifting member to said upright portion and having its pivots horizontally disposed, spaced rollers on each of said pivots, a horizontal shaft mounted on said unit above said load supporting portion and adjacent said upright portion, a sprocket on said shaft in driving engagement with said chain, reversible means for driving said shaft for exerting a push or pull on the portion of the chain between said sprocket and said load shifting member, a guide for the portion of the chain between said sprocket and said load shifting member comprising a pair of supporting rails upon which said spaced rollers of the pivots travel and a pair of hold down rails closely overlying the tops of said rollers, and a guide for the unattached end of the chain carried by said upright portion and extending upwardly from said sprocket.

5. A load handling unit having a load supporting member, a load shifting member movable on said supporting member, a sprocket chain having one end attached to said load shifting member and its opposite end unattached, said sprocket chain comprising spaced parallel pivot pins carrying rollers spaced apart on the pins and arranged in rows longitudinally of the chain and links connecting the pivot pins between the rows of rollers, a driving sprocket having teeth engageable with the rollers of each row, reversible means for driving said sprocket, a guideway on said supporting member having portions closely overlying opposite faces of the chain to hold the same against buckling when subjected to pushing thrusts, and a guideway for the portion of the chain between said sprocket and said unattached end.

6. A load handling unit having a load supporting member, a load shifting member movable on said supporting member, a sprocket chain having one end attached to said load shifting member and its opposite end unattached, said sprocket chain comprising spaced parallel pivot pins carrying rollers spaced apart on the pins and arranged in rows longitudinally of the chain and links connecting the pivot pins between the rows of rollers, a driving sprocket having teeth engageable with the rollers of each row, reversible means for driving said sprocket, a guideway on said supporting member having portions closely overlying opposite faces of the chain to hold the same against buckling when subjected to pushing thrusts, and a guideway in which the unattached end of said chain has endwise movement, the latter guideway having an end portion adjacent said sprocket and being curved to provide reversely extending portions.

7. A load handling unit having a horizontally extending load supporting portion, a load shifting member mounted for linear movement on said load supporting portion, a plurality of sprocket chains each having one end attached to said load shifting member and its opposite end unattached, a shaft mounted on said unit above said load supporting portion, spaced sprockets on said shaft having driving engagement with said chains, reversible driving means for said shaft, parallel guides on said supporting portions for guiding the portion of each chain between its sprocket and said load shifting means, each of said guides having portions closely overlying the top and bottom faces of said chains to hold them against buckling when subject to a thrust pushing them toward said load shifting member, said guides terminating adjacent said sprockets, and a guide for the portion of each chain extending from its sprocket to its unattached end, each of the latter guides extending upwardly from a sprocket.

8. A load handling unit having an upright portion and a load supporting portion extending horizontally from said upright portion, a plurality of parallel guideways on said upright portion extending upwardly from said load supporting portion, a shaft extending transversely of said guideways above said load supporting portion and adjacent the juncture of said load supporting portion and said upright portion, sprocket chains, each having one end portion guided in one of said runways and its opposite end portion supported on said horizontal portion, sprockets on said shaft, each in driving engagement with one of said chains, reversible driving means for said shaft, a guideway for each chain on said horizontal portion, each guideway having a supporting portion upon which the chain rests and a pair of laterally spaced hold down rails closely overlying the chain, supporting arms, one rigidly attached to each chain and extending upwardly through the space between the hold down rails overlying the said chain, and a load shifting member supported on said arms out of contact with said supporting portion of said unit.

9. A load handling unit having an upright portion and a load supporting portion extending horizontally from said upright portion, a plurality of parallel guideways on said upright portion extending upwardly from said load supporting portion, a shaft extending transversely of said guideways above said load supporting portion and adjacent the juncture of said load supporting portion and said upright portion, sprocket chains, each having one end portion guided in one of said runways and its opposite end portion supported on said horizontal portion, sprockets on said shaft, each in driving engagement with one of said chains, a reversible motor on said unit, a driving connection from said motor to said shaft, a guideway for each chain on said horizontal portion, each guideway having a supporting portion on which the chain rests and a holddown portion closely overlying the chain to prevent buckling of the chain, and a load shifting member attached to said chains and movable on said supporting portion toward and away from said vertical portion.

10. The combination with a lift truck provided with a vertically movable carriage provided with spaced horizontally extending fork arms, of a load handling unit having a load supporting platform and an upright portion at one end of said platform, a load shifting member mounted on said platform for movement toward or away from said upright portion, a motor on said upright portion, means operated by said motor for moving the load shifting member toward or away from said upright portion, spaced supporting members attached to the underside of said platform to support the platform on a floor at a height to permit said fork arms to enter between the floor and platform, said supporting members being constructed and arranged to permit entry of said fork arms from either side or from the end of said platform at which said upright portion is located and to restrain movements of said platform with respect to said forks in the various positions of the platform with respect to the forks.

11. The combination with a lift truck provided with a vertically movable carriage provided with spaced horizontally extending fork arms, of a load handling unit having a load supporting platform and an upright portion at one end of said platform, a load shifting member mounted on said platform for movement toward or away from said upright portion, a motor on said upright portion, means operated by said motor for moving the load shifting member toward or away from said upright portion, spaced skids attached to the under side of said platform and formed to receive said fork arms longitudinally thereof, said skids having transversely alined openings positioned to receive said fork arms transversely thereof.

12. The combination with a lift truck provided with a vertically movable carriage provided with spaced horizontally extending fork arms, of a load handling unit having a load supporting platform and an upright portion at one end of said platform, a load shifting member mounted on said platform for movement toward or away from said upright portion, a motor on said upright portion, means operated by said motor for moving the load shifting member toward or away from said upright portion, spaced transversely extending skids in the form of channels open at both ends and positioned to receive said fork arms whereby lifting forks may be entered into them from either side of said platform, said skids having alined transverse fork arm receiving openings into which said fork arms may be entered from an end of the platform.

13. The combination with a lift truck having a vertically movable carriage provided with spaced horizontally extending fork arms, of a load handling unit detachably mounted on said fork arms and comprising a load supporting platform resting on said fork arms, an upright portion at one end of said platform, a load shifting member extending across said platform and movable thereon toward and away from said upright portion, means for attaching said unit to said fork arms with said platform extending from said upright portion transversely of said fork arms at either side of the truck or with said platform extending from said upright portion in the direction of said fork arms, a load shifting cross bar disposed transversely of said platform and movable toward and away from said upright portion, a motor on said upright portion of said unit, and mechanism operated by said motor for moving said load shifting member in either direction.

14. The combination as defined in claim 13 in which said motor is an electric motor, in which said truck has a battery, in which said truck and said unit have detachably connected conductors for supplying current to said motor from said battery, and in which said motor is controlled by manually operable switches on a handle attached to an extension cord.

15. The combination with a lift truck having a vertically movable carriage provided with spaced horizontally extending fork arms, of a load handling unit detachably mounted on said fork arms and comprising a load supporting platform resting on said fork arms, an upright portion at one end of said platform, a load shifting member extending across said platform and movable thereon toward and away from said upright portion, means for attaching said unit to said fork arms with said platform extending from said upright portion transversely of said fork arms at either side of the truck or with said platform extending from said upright portion in the direction of said fork arms, a load shifting cross bar disposed transversely of said platform and movable toward and away from said upright portion, sprocket chains, each attached at one end to said load shifting member and extending therefrom to said upright portion, guideways for said chains having portions above and below the chains for holding the chains against buckling, guideways in said vertical portion for the other end of said chains, sprockets adjacent said upright portion in driving engagement with said chains, a reversible motor mounted on said upright portion and a driving connection from said motor to said sprockets.

16. A load handling unit for lift trucks comprising a carriage having horizontally extending fork arms, a load shifting member movable longitudinally of said fork arms and having fork arm portions telescopically mounted on said carriage fork arms, sprocket chains extending longitudinally of each carriage fork arm, each chain having one end attached to said load shifting member and its opposite end unattached, a sprocket adjacent the inner end of each carriage fork arm, each in driving engagement with one of said chains, reversible driving means for said sprockets, guideways for said chains in said carriage fork arms, each of said guideways having portions closely overlying the top and bottom faces of the chains to hold the same against buckling under pushing thrusts, and an upwardly extending guideway for the unattached ends of the chains.

References Cited in the file of this patent

UNITED STATES PATENTS

| Number | Name | Date |
|---|---|---|
| 1,563,650 | Pleines | Dec. 1, 1925 |
| 1,896,543 | Gfrorer | Feb. 7, 1933 |
| 2,120,042 | Remde | June 7, 1938 |
| 2,410,373 | Westervelt | Oct. 29, 1946 |
| 2,509,682 | Golrick | May 30, 1950 |
| 2,516,881 | Jarvis | Aug. 1, 1950 |
| 2,536,068 | Lehmann | Jan. 2, 1951 |
| 2,547,329 | Lapham | Apr. 3, 1951 |
| 2,574,045 | Lapham | Nov. 6, 1951 |
| 2,643,740 | Quayle | June 30, 1953 |
| 2,699,878 | Avery | Jan. 18, 1955 |
| 2,733,822 | Woodard | Feb. 7, 1956 |